(12) United States Patent
Jiang et al.

(10) Patent No.: US 12,127,203 B2
(45) Date of Patent: Oct. 22, 2024

(54) METHOD AND DEVICE IN NODES USED FOR WIRELESS COMMUNICATION

(71) Applicants: Qi Jiang, Shanghai (CN); Xiaobo Zhang, Shanghai (CN)

(72) Inventors: Qi Jiang, Shanghai (CN); Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 494 days.

(21) Appl. No.: 17/372,512

(22) Filed: Jul. 11, 2021

(65) Prior Publication Data

US 2021/0345386 A1 Nov. 4, 2021

Related U.S. Application Data

(63) Continuation of application No. PCT/CN2021/073911, filed on Jan. 27, 2021.

(30) Foreign Application Priority Data

Feb. 1, 2020 (CN) .......................... 202010077819.3

(51) Int. Cl.
*H04W 72/21* (2023.01)
*H04W 72/0453* (2023.01)

(52) U.S. Cl.
CPC ....... *H04W 72/21* (2023.01); *H04W 72/0453* (2013.01)

(58) Field of Classification Search
CPC ....... H04L 5/001; H04L 5/0053; H04W 72/21
See application file for complete search history.

(56) References Cited

U.S. PATENT DOCUMENTS

| 2013/0083766 A1* | 4/2013 | Chung | ............ H04L 5/001 370/329 |
|---|---|---|---|
| 2013/0100917 A1 | 4/2013 | Seo et al. | |
| 2013/0229998 A1 | 9/2013 | Noh et al. | |
| 2014/0192738 A1 | 7/2014 | Nam | |
| 2022/0039142 A1* | 2/2022 | Li | ............ H04L 5/0096 |

(Continued)

FOREIGN PATENT DOCUMENTS

| CN | 101686557 A | 3/2010 |
|---|---|---|
| CN | 105210403 A | 12/2015 |

(Continued)

OTHER PUBLICATIONS

ISR in application PCT/CN2021/073911 dated May 7, 2021.

(Continued)

*Primary Examiner* — Syed Ali

(57) ABSTRACT

The present disclosure provides a method and a device in a node for wireless communications. A first node transmits a first signal in a first cell, and transmits a second signal in a second cell; a serving cell identity of the first cell is a first ID, and a serving cell identity of the second cell is a second ID, the first ID being smaller than the second ID; when the second cell is capable of scheduling a target cell, the second signal comprises first UCI; when the second cell is incapable of scheduling a target cell, the first signal comprises the first UCI. By associating whether a cell can piggyback UCI with whether a cell can schedule a PCell, the present disclosure manages to optimize UCI transmitting under Cross-Carrier Scheduling, hence improving the entire system's performance.

17 Claims, 4 Drawing Sheets

(56) References Cited

U.S. PATENT DOCUMENTS

| | | | |
|---|---|---|---|
| 2022/0053522 A1* | 2/2022 | MolavianJazi ... | H04W 72/1263 |
| 2022/0086882 A1* | 3/2022 | Takeda .................. | H04L 5/0096 |
| 2022/0173850 A1* | 6/2022 | Xu ........................ | H04L 5/0044 |
| 2022/0174685 A1* | 6/2022 | Lee .......................... | H04B 1/74 |
| 2022/0264608 A1* | 8/2022 | Bae ........................ | H04L 1/0072 |
| 2022/0295558 A1* | 9/2022 | Lei .......................... | H04L 5/001 |
| 2022/0337456 A1* | 10/2022 | Kwak .................. | H04L 5/0053 |
| 2022/0338227 A1* | 10/2022 | Cirik .................... | H04W 72/53 |
| 2023/0291455 A1* | 9/2023 | Xu ........................ | H04L 5/0051 |

FOREIGN PATENT DOCUMENTS

| | | |
|---|---|---|
| CN | 106550467 A | 3/2017 |
| CN | 106688202 A | 5/2017 |
| WO | 2015047673 A1 | 4/2015 |

OTHER PUBLICATIONS

Ericsson: "On Remaining Issues on UCI Multiplexing on PUSCH",3GPP Draft; R1-1802908 on Remaining Issues on UCI Multiplexing on PUSCH,3rd Generation Partnership Project(3GPP), Mobile Competence Centre ;650, Route Des Lucioles;F-06921 Sophia-Antipolis Cedexvol. RAN WG1,no. Athens,Greece; Feb. 26, 2018-Mar. 2, 2018Feb. 17, 2018(Feb. 17, 2018).
3GPP TSG-RAN WG1 Meeting 96bis R1-1905915 "Ericsson Summary of email discussion[96b-NR-11]" Apr. 12, 2019.
CN202010077819.3 1st Office Action dated Dec. 20, 2021.
CN202010077819.3 First Search Report dated Dec. 10, 2021.

* cited by examiner

METHOD AND DEVICE IN NODES USED FOR WIRELESS COMMUNICATION

CROSS REFERENCE TO RELATED APPLICATIONS

This application is a continuation of International Application No. PCT/CN2021/073911, filed Jan. 27, 2021, claims the priority benefit of Chinese Patent Application No. 202010077819.3, filed on Feb. 1, 2020, the full disclosure of which is incorporated herein by reference.

BACKGROUND

Technical Field

The present disclosure relates to transmission methods and devices in wireless communication systems, and in particular to a transmission method and device in Cross-Carrier Scheduling in wireless communications.

Related Art

Application scenarios of future wireless communication systems are becoming increasingly diversified, and different application scenarios have different performance demands on systems. In traditional Long-Term Evolution (LTE) and Long-Term Evolution Advanced (LTE-A) systems, the technique of Carrier Aggregation (CA) is introduced to enhance transmission bandwidth and the capacity of Physical Downlink Control Channel (PDCCH). The technique enables a scheduling carrier to schedule another carrier through the way of Cross-Carrier Scheduling, but, considering the system's stability and realizability, a Primary Cell (PCell) can only be self-scheduling.

In 5G and subsequent evolutions of Release 17, the technique of Dynamic Spectrum Sharing (DSS) makes the sharing of LTE and 5G spectrums a reality; when a terminal's PCell is a New Radio Access Technology (NR) carrier and its SCell is an LTE carrier, the NR carrier can be scheduled by the LTE carrier. The Radio Access Network (RAN) #86 Plenary decided to study DSS-relevant technologies and began the work of standardization.

SUMMARY

As a subject in the research of DSS, an SCell will be scheduling a PCell. In traditional CA, a PCell serves as a primary cell of a terminal, having the strongest robustness, in the meantime, when Uplink Control Information (UCI) needs to be piggybacked onto a Physical Uplink Shared Channel (PUSCH), the terminal will preferentially choose the PUSCH transmitted on the PCell for piggybacking the UCI. If the terminal does not transmit a PUSCH on the PCell, it is the PUSCH transmitted on a Secondary Cell (SCell) with a smallest serving cell identity that piggybacks the UCI, thereby ensuring the UCI performance. When an SCell is capable of scheduling a PCell, the above mechanism of Piggyback shall be redesigned. In view of these problems, the method of selecting a UCI-carrying PUSCH from multiple serving cells shall be redesigned.

To address the above problem pertaining to new scenarios of DSS, the present disclosure provides a solution. It should be noted that though the present disclosure only took the DSS for example in the statement above, it is also applicable to other scenarios of Unlicensed Spectrum, where similar technical effects can be achieved. Similarly, the present disclosure also applies to scenarios where networks like cellular network or IoT equipment are established. Additionally, the adoption of a unified solution for various scenarios contributes to the reduction of hardcore complexity and costs.

It should be noted that if no conflict is incurred, embodiments in a first node in the present disclosure and the characteristics of the embodiments are also applicable to a second node, and vice versa. What's more, the embodiments in the present disclosure and the characteristics in the embodiments can be arbitrarily combined if there is no conflict.

The present disclosure provides a method in a first node for wireless communications, comprising:
  transmitting a first signal in a first cell, and transmitting a second signal in a second cell;
  herein, a serving cell identity of the first cell is a first ID, while a serving cell identity of the second cell is a second ID, the first ID being smaller than the second ID; when the second cell is capable of scheduling a target cell, the second signal comprises first uplink control information (UCI); when the second cell is incapable of scheduling the target cell, the first signal comprises the first UCI.

In one embodiment, the above method is advantageous in that whether an SCell can piggyback UCI is associated with whether the SCell is capable of scheduling a PCell, since an SCell capable of scheduling a PCell has relatively stabler performance, the SCell capable of scheduling the PCell comes first in UCI piggyback so as to ensure the UCI's performance. According to one aspect of the present disclosure, comprising:
  receiving first information, the first information indicating a scheduling cell of the target cell;
  herein, when the scheduling cell of the target cell comprises the second cell, the second cell is capable of scheduling the target cell; when the scheduling cell of the target cell does not comprise the second cell, the second cell is incapable of scheduling the target cell.

In one embodiment, the above method is characterized in that when the target cell is a PCell, a traditional Radio Resource Control (RRC) signaling is employed to indicate a cell capable of scheduling the PCell.

According to one aspect of the present disclosure, the target cell is the first cell.

In one embodiment, the above method is advantageous in that when the second cell is capable of scheduling the target cell, and the target cell is a PCell, UCI will be transmitted on the second cell rather than on the PCell; the above method shows that the second cell is still of higher reliability than the PCell.

According to one aspect of the present disclosure, the second ID is equal to 1.

In one embodiment, the above method is advantageous in that by setting a serving cell identity of an SCell capable of scheduling a PCell as 1, the above SCell is correspondingly deemed as a cell of highest priority other than the PCell.

According to one aspect of the present disclosure, comprising:
  receiving a target signal in a third cell;
  herein, the first UCI is used for determining that the target signal is correctly received by the first node; the third cell is different from the second cell.

In one embodiment, the above method is characterized in that the first UCI comprises a Hybrid Automatic reQuest Acknowledgement (HARQ-ACK).

According to one aspect of the present disclosure, both the first cell and the second cell belong to a first cell group, the first cell group comprises K1 cells, and the first cell group comprises a fourth cell, the fourth cell capable of scheduling of the target cell; a serving cell identity of the fourth ID is a fourth ID, the second ID being smaller than the fourth ID.

In one embodiment, the above method is advantageous in that when there are multiple SCells capable of scheduling a PCell, an SCell with a smallest serving cell identity among these SCells piggybacks UCI.

According to one aspect of the present disclosure, comprising:
receiving a first signaling and a second signaling;
herein, the first signaling is used for indicating a first time-frequency resource set, and the second signaling is used for indicating a second time-frequency resource set; an uplink carrier for the first cell comprises frequency-domain resourced occupied by the first time-frequency resource set, and an uplink carrier for the second cell comprises the second time-frequency resource set; the first signal is transmitted in the first time-frequency resource set, while the second signal is transmitted in the second time-frequency resource set.

According to one aspect of the present disclosure, a first time window comprises time-domain resources occupied by the first signal and time-domain resources occupied by the second signal, and the first node does not transmit any radio signal in the target cell in the first time window.

In one embodiment, the above method is advantageous in that only when no uplink channel is transmitted on a PCell can the scheme of piggyback proposed in the present disclosure be used.

The present disclosure provides a method in a second node for wireless communications, comprising:
receiving a first signal in a first cell, and receiving a second signal in a second cell;
herein, a serving ID of the first cell is a first ID, while a serving cell identity of the second cell is a second ID, the first ID being smaller than the second ID; when the second cell is capable of scheduling a target cell, the second signal comprises first UCI; when the second cell is incapable of scheduling the target cell, the first signal comprises the first UCI.

According to one aspect of the present disclosure, comprising:
transmitting first information, the first information indicating a scheduling cell of the target cell;
herein, when the scheduling cell of the target cell comprises the second cell, the second cell is capable of scheduling the target cell; when the scheduling cell of the target cell does not comprise the second cell, the second cell is incapable of scheduling the target cell.

According to one aspect of the present disclosure, the target cell is the first cell.

According to one aspect of the present disclosure, the second ID is equal to 1.

According to one aspect of the present disclosure, comprising:
transmitting a target signal in a third cell;
herein, the first UCI is used for determining that the target signal is correctly received by a transmitter of the second signal; the third cell is different from the second cell.

According to one aspect of the present disclosure, both the first cell and the second cell belong to a first cell group, the first cell group comprises K1 cells, and the first cell group comprises a fourth cell, the fourth cell capable of scheduling of the target cell; a serving cell identity of the fourth ID is a fourth ID, the second ID being smaller than the fourth ID.

According to one aspect of the present disclosure, comprising:
transmitting a first signaling and a second signaling;
herein, the first signaling is used for indicating a first time-frequency resource set, and the second signaling is used for indicating a second time-frequency resource set; an uplink carrier for the first cell comprises frequency-domain resourced occupied by the first time-frequency resource set, and an uplink carrier for the second cell comprises the second time-frequency resource set; the first signal is transmitted in the first time-frequency resource set, while the second signal is transmitted in the second time-frequency resource set.

According to one aspect of the present disclosure, a first time window comprises time-domain resources occupied by the first signal and time-domain resources occupied by the second signal, and the first node does not transmit any radio signal in the target cell in the first time window.

The present disclosure provides a first node for wireless communications, characterized in comprising:
a first transmitter, which transmits a first signal in a first cell, and transmits a second signal in a second cell;
herein, a serving cell identity of the first cell is a first ID, while a serving cell identity of the second cell is a second ID, the first ID being smaller than the second ID; when the second cell is capable of scheduling a target cell, the second signal comprises first UCI; when the second cell is incapable of scheduling the target cell, the first signal comprises the first UCI.

The present disclosure provides a first node for wireless communications, characterized in comprising:
a second receiver, which receives a first signal in a first cell, and receives a second signal in a second cell;
herein, a serving ID of the first cell is a first ID, while a serving cell identity of the second cell is a second ID, the first ID being smaller than the second ID; when the second cell is capable of scheduling a target cell, the second signal comprises first UCI; when the second cell is incapable of scheduling the target cell, the first signal comprises the first UCI.

In one embodiment, the present disclosure has the following advantages compared with the prior art:
Association is created between whether an SCell is capable of piggybacking UCI and an SCell capable of scheduling a PCell, since the SCell capable of scheduling the PCell has more stable relative performance, it can piggyback UCI in the first place so as to ensure the performance of UCI.

When the target cell is a PCell, a traditional RRC signaling is employed to indicate a cell that can schedule the PCell.

By setting a serving cell identity of an SCell capable of scheduling a PCell as 1, the above SCell is correspondingly regarded as a cell of highest priority other than the PCell.

When multiple SCells can be used for scheduling a PCell, UCI is piggybacked by one SCell of minimum serving cell identity of the multiple SCells.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
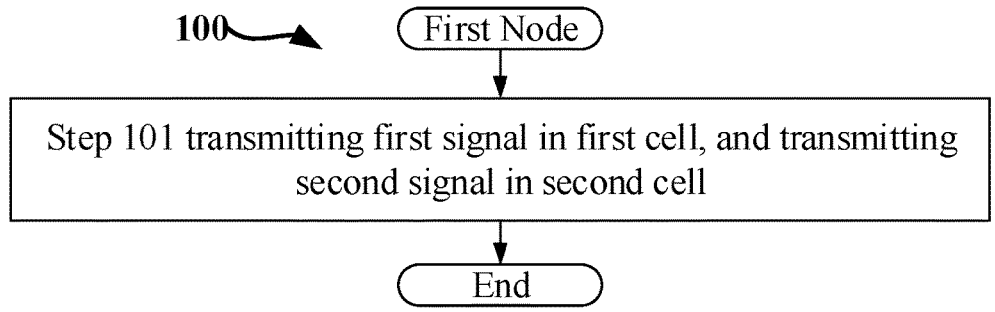
FIG. 1 illustrates a flowchart of processing of a first node according to one embodiment of the present disclosure.

Embodiment 1 illustrates a flowchart of processing of a first node, as shown in FIG. 1. In 100 illustrated by the figure, each box represents a step. In Embodiment 1, a first node in the present disclosure transmits a first signal in a first cell and transmits a second signal in a second cell in step 101.

In Embodiment 1, a serving cell identity of the first cell is a first ID, while a serving cell identity of the second cell is a second ID, the first ID being smaller than the second ID; when the second cell is capable of scheduling a target cell, the second signal comprises first UCI; when the second cell is incapable of scheduling the target cell, the first signal comprises the first UCI.

In one embodiment, the first cell is a Serving Cell.
In one embodiment, the second cell is a Serving Cell.
In one embodiment, the first cell is a Secondary Cell.
In one embodiment, the second cell is a Secondary Cell.
In one embodiment, the first ID is a Serving Cell Identity.
In one embodiment, the first ID is a ServCellIndex.
In one embodiment, the first ID is a ServCellId.
In one embodiment, the second ID is a Serving Cell Identity.
In one embodiment, the second ID is a ServCellIndex.
In one embodiment, the second ID is a ServCellId.
In one embodiment, the first ID is a non-negative integer.
In one embodiment, the second ID is a non-negative integer.
In one embodiment, the first ID is a Carrier Indicator Field (CIF).
In one embodiment, the second ID is a CIF.
In one embodiment, the phrase of transmitting a first signal in a first cell includes the meaning of transmitting the first signal in frequency-domain resources occupied by the first cell.
In one embodiment, the phrase of transmitting a first signal in a first cell includes the meaning that the first cell is deployed in a first carrier, and the first signal is transmitted in the first carrier.
In one embodiment, the phrase of transmitting a first signal in a first cell includes the meaning that the first node transmits the first signal according to an uplink timing of the first cell.
In one embodiment, the phrase of transmitting a second signal in a second cell includes the meaning of transmitting the second signal in frequency-domain resources occupied by the second cell.
In one embodiment, the phrase of transmitting a second signal in a second cell includes the meaning that the second cell is deployed in a second carrier, and the second signal is transmitted in the second carrier.
In one embodiment, the phrase of transmitting a second signal in a second cell includes the meaning that the first node transmits the second signal according to an uplink timing of the second cell.
In one embodiment, the first carrier in the present disclosure is an NR carrier.
In one embodiment, the first carrier in the present disclosure is a 5G carrier.
In one embodiment, the first carrier in the present disclosure is of a frequency-domain range between 450 MHz and 6 GHz.
In one embodiment, the first carrier in the present disclosure is of a frequency-domain range between 24.25 GHz and 52.6 GHz.
In one embodiment, the second carrier in the present disclosure is a Long-term Evolution (LTE) carrier.
In one embodiment, the second carrier in the present disclosure is a Long-term Evolution Advanced (LTE-A) carrier.
In one embodiment, the target cell is a Serving Cell.
In one embodiment, the target cell is a Primary Cell.
In one embodiment, a serving cell identity of the target cell is a target ID.
In one embodiment, the target ID is a ServCellIndex.
In one embodiment, the target ID is a ServCellId.
In one embodiment, the target ID is a CIF.
In one embodiment, the target ID is equal to 0.
In one embodiment, the target cell is deployed in a target carrier, the target carrier being a 5G carrier.
In one embodiment, the target cell is deployed in a target carrier, the target carrier being of a frequency-domain range between 450 MHz and 6 GHz.
In one embodiment, the target cell is deployed in a target carrier, the target carrier being of a frequency-domain range between 24.25 GHz and 52.6 GHz.
In one embodiment, the first signal is a radio signal.
In one embodiment, the first signal is a baseband signal.
In one embodiment, the second signal is a radio signal.
In one embodiment, the second signal is a baseband signal.
In one embodiment, a physical layer channel carrying the first signal is a Physical Uplink Shared Channel (PUSCH).
In one embodiment, a physical layer channel carrying the second signal is a PUSCH.

In one embodiment, a transmission channel carrying the first signal is an Uplink Shared Channel (UL-SCH).

In one embodiment, a transmission channel carrying the second signal is a UL-SCH.

In one embodiment, the first signal and the second signal are transmitted in a same slot.

In one embodiment, frequency-domain resources occupied by the first cell and frequency-domain resources occupied by the second cell are orthogonal.

In one subembodiment, the phrase that frequency-domain resources occupied by the first cell and frequency-domain resources occupied by the second cell are orthogonal includes the meaning that the frequency-domain resources occupied by the first cell and the frequency-domain resources occupied by the second cell are non-overlapping.

In one subembodiment, the phrase that frequency-domain resources occupied by the first cell and frequency-domain resources occupied by the second cell are orthogonal includes the meaning that there isn't any subcarrier belonging to the frequency-domain resources occupied by the first cell and the frequency-domain resources occupied by the second cell simultaneously.

In one embodiment, the first cell and the second cell are respectively deployed in a first carrier and a second carrier in frequency domain.

In one embodiment, an uplink carrier of the first cell and an uplink carrier of the second cell are respectively deployed in a first carrier and a second carrier in frequency domain.

In one subembodiment, frequency-domain resources occupied by the first carrier and frequency-domain resources occupied by the second carrier are orthogonal.

In one embodiment, a downlink carrier of the first cell and a downlink carrier of the second cell are respectively deployed in a third carrier and a fourth carrier.

In one subembodiment, frequency-domain resources occupied by the third carrier and frequency-domain resources occupied by the fourth carrier are orthogonal.

In one embodiment, the above phrase that the second cell is capable of scheduling a target cell includes the meaning that a control signaling on the second cell can trigger data transmission on the target cell.

In one embodiment, the above phrase that the second cell is capable of scheduling a target cell includes the meaning that a downlink carrier of the second cell is deployed in a third carrier in frequency domain, and an uplink carrier of the target cell is deployed in a target carrier in frequency domain, and a control signaling on the third carrier can trigger data transmission on the target carrier.

In one embodiment, the above phrase that the second cell is incapable of scheduling the target cell includes the meaning that a control signaling on the second cell cannot trigger data transmission on the target cell.

In one embodiment, the above phrase that the second cell is incapable of scheduling the target cell includes the meaning that a downlink carrier of the second cell is deployed in a fourth carrier in frequency domain, and an uplink carrier of the target cell is deployed in a target carrier in frequency domain, and a control signaling on the fourth carrier cannot trigger data transmission on the target carrier.

In one embodiment, when the control signaling on the second cell can trigger data transmission on the target cell, the second cell is capable of scheduling a target cell; when the control signaling on the second cell cannot trigger data transmission on the target cell, the second cell is incapable of scheduling a target cell.

In one embodiment, the control signaling in the present disclosure is a physical layer signaling.

In one embodiment, the control signaling in the present disclosure comprises Downlink Control Information (DCI).

In one embodiment, the data transmission in the present disclosure comprises a Transport Block (TB) transmission or reception.

In one embodiment, the data transmission in the present disclosure comprises a PUSCH.

In one embodiment, the data transmission in the present disclosure comprises a Physical Downlink Shared Channel (PDSCH).

In one embodiment, the target cell is the first cell.

In one embodiment, the target cell is a PCell of the first node.

In one embodiment, a serving cell identity of the target cell is smaller than the first ID.

In one embodiment, the first node receives a System Information Block (SIB) on the target cell.

In one embodiment, the first UCI comprises Channel State Information (CSI).

In one embodiment, the first UCI comprises a HARQ-ACK.

In one embodiment, the first UCI comprises a Scheduling Request (SR).

Embodiment 2

Figure 2:
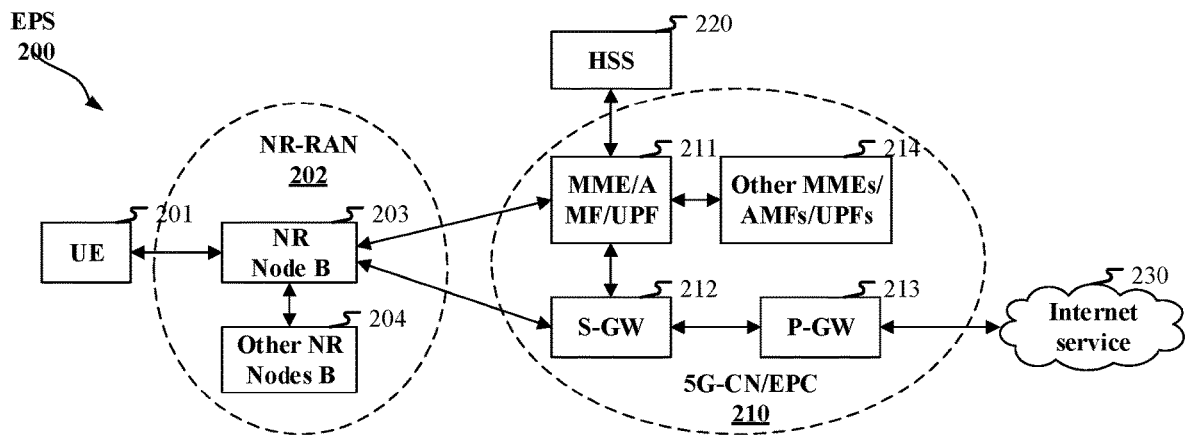
FIG. 2 illustrates a schematic diagram of a network architecture according to one embodiment of the present disclosure.

Embodiment 2 illustrates a schematic diagram of a network architecture, as shown in FIG. 2.

FIG. 2 is a diagram illustrating a network architecture 200 of 5G NR, Long-Term Evolution (LTE), and Long-Term Evolution Advanced (LTE-A) systems. The 5G NR or LTE network architecture 200 may be called an Evolved Packet System (EPS) 200 or other appropriate terms, which may comprise one or more UEs 201, an NG-RAN 202, an Evolved Packet Core/5G Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services. The NG-RAN 202 comprises an NR node B (gNB) 203 and other gNBs 204. The gNB 203 provides UE 201-oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistant (PDA), Satellite Radios, Global Positioning Systems (GPSs), multimedia devices, video devices, digital audio players (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 comprises a Mobility Management Entity (MME)/Authentication Management Field (AMF)/User Plane Function (UPF) 211, other MMEs/ AMFs/UPFs 214, a Service Gateway (S-GW) 212 and a Packet Date Network Gateway (P-GW) 213. The MME/ AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet Service 230. The Internet Service 230 comprises operator-compatible IP services, specifically including Internet, Intranet, IP Multimedia Subsystem (IMS) and Packet Switching Streaming (PSS) services.

In one embodiment, the UE 201 corresponds to the first node in the present disclosure.

In one embodiment, the UE 201 is a terminal supporting Cross-Carrier Scheduling.

In one embodiment, the UE 201 can be scheduled simultaneously on multiple carriers.

In one embodiment, the UE 201 can be served simultaneously on an LTE carrier and an NR carrier.

In one embodiment, the UE 201 can be served simultaneously on an LTE-A carrier and an NR carrier.

In one embodiment, the gNB203 corresponds to the second node in the present disclosure.

In one embodiment, the gNB203 supports Cross-Carrier Scheduling.

In one embodiment, the gNB203 can be used to schedule a terminal on multiple carriers simultaneously.

In one embodiment, the gNB203 can serve a first node simultaneously on an LTE carrier and an NR carrier.

In one embodiment, the gNB203 can serve a first node simultaneously on an LTE-A carrier and an NR carrier.

In one embodiment, an air interface between the UE201 and the gNB203 is a Uu interface.

In one embodiment, a wireless link between the UE201 and the gNB203 is a cellular link.

Embodiment 3

Figure 3:
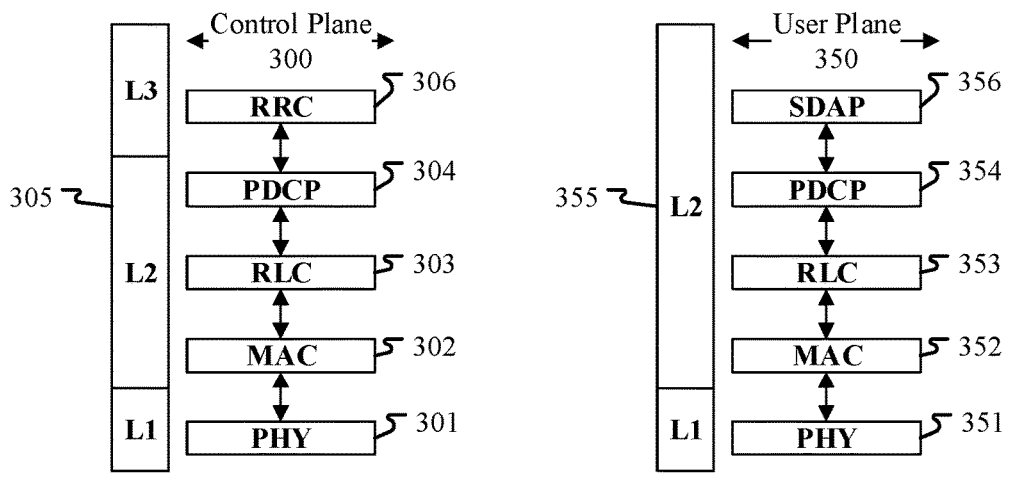
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane according to the present disclosure, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first communication node (UE, gNB or, RSU in V2X) and a second communication node (gNB, UE, or RSU in V2X) is represented by three layers, which are a layer 1, a layer 2 and a layer 3, respectively. The layer 1 (L1) is the lowest layer which performs signal processing functions of various PHY layers. The L1 is called PHY 301 in the present disclosure. The layer 2 (L2) 305 is above the PHY 301, and is in charge of the link between the first communication node and the second communication node via the PHY 301. The L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication nodes of the network side. The PDCP sublayer 304 provides multiplexing among variable radio bearers and logical channels. The PDCP sublayer 304 provides security by encrypting a packet and provides support for handover of a first communication node between second communication nodes. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling between the second communication node and the first communication node. The radio protocol architecture in the user plane 350 comprises the L1 layer and the L2 layer. In the user plane 350, the radio protocol architecture used for the first communication node and the second communication node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. Although not described in FIG. 3, the first communication node may comprise several higher layers above the L2 355, such as a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the PDCP sublayer 304 in the second communication node is used for generating scheduling of the first communication node.

In one embodiment, the PDCP sublayer 354 in the second communication node is used for generating scheduling of the first communication node.

In one embodiment, the first signal is generated by the PHY301, or the PHY351.

In one embodiment, the first signal is generated by the MAC352, or the MAC302.

In one embodiment, the first signal is generated by the RRC 306.

In one embodiment, the second signal is generated by the PHY301, or the PHY351.

In one embodiment, the second signal is generated by the MAC352, or the MAC302.

In one embodiment, the second signal is generated by the RRC 306.

In one embodiment, the first information is generated by the MAC352, or the MAC302.

In one embodiment, the first information is generated by the RRC 306.

In one embodiment, the target signal is generated by the PHY301, or the PHY351.

In one embodiment, the target signal is generated by the MAC352, or the MAC302.

In one embodiment, the target signal is generated by the RRC 306.

In one embodiment, the first signaling is generated by the PHY301, or the PHY351.

In one embodiment, the first signaling is generated by the MAC352, or the MAC302.

In one embodiment, the second signaling is generated by the PHY301, or the PHY351.

In one embodiment, the second signaling is generated by the MAC352, or the MAC302.

Embodiment 4

Figure 4:
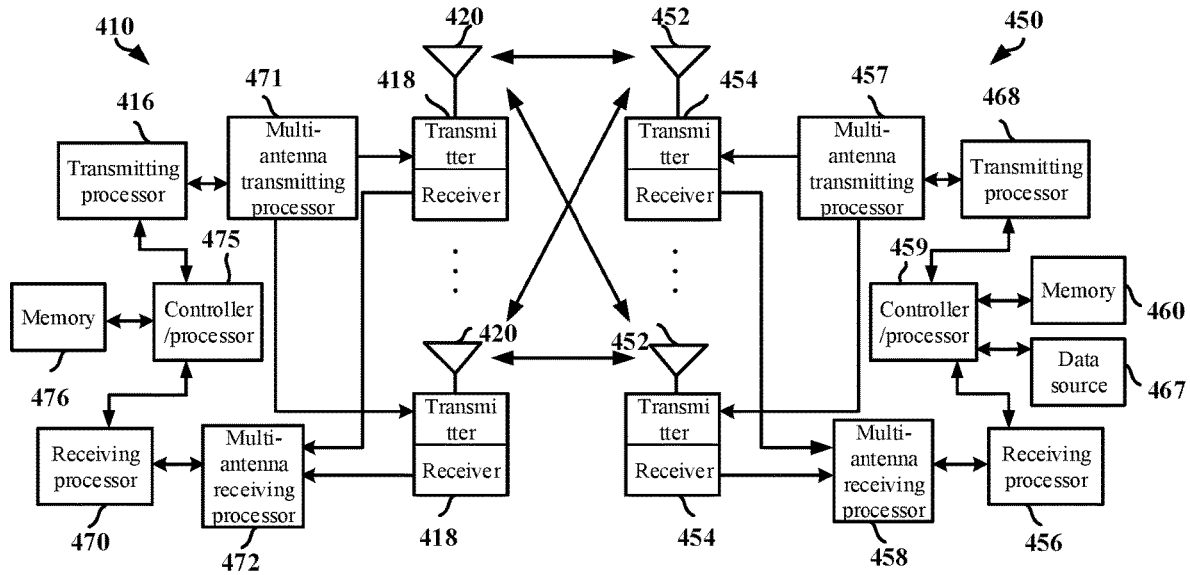
FIG. 4 illustrates a schematic diagram of a first communication device and a second communication device according to one embodiment of the present disclosure.

Embodiment 4 illustrates a schematic diagram of a first communication device and a second communication device according to the present disclosure, as shown in FIG. 4. FIG. 4 is a block diagram of a first communication device 450 and a second communication device 410 in communication with each other in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the second communication device 410, a higher layer packet from a core network is provided to the controller/processor 475. The controller/processor 475 implements the functionality of the L2 layer. In the transmission from the second communication device 410 to the first communication device 450, the controller/processor 475 provides header compression, encryption, packet segmentation and reordering, multiplexing between a logical channel and a transport channel and radio resource allocation of the first communication device 450 based on various priorities. The controller/processor 475 is also in charge of a retransmission of a lost packet and a signaling to the first communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 410 side and the mapping of signal clusters corresponding to each modulation scheme (i.e., BPSK, QPSK, M-PSK, and M-QAM, etc.). The multi-antenna transmitting processor 471 performs digital spatial precoding, including codebook-based precoding and non-codebook-based precoding, and beamforming processing on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams.

Each transmitter 418 converts a baseband multicarrier symbol stream provided by the multi-antenna transmitting processor 471 into a radio frequency (RF) stream, which is later provided to antennas 420.

In a transmission from the second communication device 410 to the first communication device 450, at the first communication device 450, each receiver 454 receives a signal via a corresponding antenna 452. Each receiver 454 recovers information modulated onto the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts the processed baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any first communication device 450-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted by the second communication device 410. Next, the higher-layer data and control signal are provided to the controller/processor 459. The controller/processor 459 performs functions of the L2 layer. The controller/processor 459 can be associated with a memory 460 that stores program code and data. The memory 460 can be called a computer readable medium. In the transmission from the second communication device 410 to the first communication device 450, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer, or various control signals can be provided to the L3 layer for processing.

In a transmission from the first communication device 450 to the second communication device 410, at the first communication device 450, the data source 467 is configured to provide a higher-layer packet to the controller/processor 459. The data source 467 represents all protocol layers above the L2 layer. Similar to a transmitting function of the second communication device 410 described in the transmission from the second communication device 410 to the first communication device 450, the controller/processor 459 performs header compression, encryption, packet segmentation and reordering, and multiplexing between a logical channel and a transport channel based on radio resource allocation so as to provide the L2 layer functions used for the user plane and the control plane. The controller/processor 459 is also responsible for a retransmission of a lost packet, and a signaling to the second communication device 410. The transmitting processor 468 performs modulation and mapping, as well as channel coding, and the multi-antenna transmitting processor 457 performs digital multi-antenna spatial precoding, including codebook-based precoding and non-codebook-based precoding, and beamforming. The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the first communication device 450 to the second communication device 410, the function of the second communication device 410 is similar to the receiving function of the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. In the transmission from the first communication device 450 to the second communication device 410, the controller/processor 475 provides de-multiplexing between a transport channel and a logical channel, packet reassembling, decrypting, header decompression, control signal processing so as to recover a higher-layer packet from the first communication device (UE) 450. The higher-layer packet coming from the controller/processor 475 may be provided to the core network.

In one embodiment, the first communication device 450 comprises at least one processor and at least one memory. The at least one memory comprises computer program codes; the at least one memory and the computer program codes are configured to be used in collaboration with the at least one processor. The first communication device 450 at least transmits a first signal in a first cell, and transmits a second signal in a second cell; a serving cell identity of the first cell is a first ID, while a serving cell identity of the second cell is a second ID, the first ID being smaller than the second ID; when the second cell is capable of scheduling a target cell, the second signal comprises first UCI; when the second cell is incapable of scheduling the target cell, the first signal comprises the first UCI.

In one embodiment, the first communication device 450 comprises a memory that stores a computer readable instruction program. The computer readable instruction program generates actions when executed by at least one processor. The actions include transmitting a first signal in a first cell, and transmitting a second signal in a second cell; a serving cell identity of the first cell is a first ID, while a serving cell identity of the second cell is a second ID, the first ID being smaller than the second ID; when the second cell is capable of scheduling a target cell, the second signal comprises first UCI; when the second cell is incapable of scheduling the target cell, the first signal comprises the first UCI.

In one embodiment, the second communication device 410 comprises at least one processor and at least one memory. The at least one memory comprises computer program codes. The at least one memory and the computer program codes are configured to be used in collaboration with the at least one processor. The second communication device 410 at least receives a first signal in a first cell, and receives a second signal in a second cell; a serving cell identity of the first cell is a first ID, while a serving cell identity of the second cell is a second ID, the first ID being smaller than the second ID; when the second cell is capable of scheduling a target cell, the second signal comprises first UCI; when the second cell is incapable of scheduling the target cell, the first signal comprises the first UCI.

In one embodiment, the second communication device 410 comprises a memory that stores a computer readable instruction program. The computer readable instruction program generates actions when executed by at least one processor. The actions include receiving a first signal in a first cell, and receiving a second signal in a second cell; a serving cell identity of the first cell is a first ID, while a serving cell identity of the second cell is a second ID, the first ID being smaller than the second ID; when the second cell is capable of scheduling a target cell, the second signal comprises first UCI; when the second cell is incapable of scheduling the target cell, the first signal comprises the first UCI.

In one embodiment, the first communication node 450 corresponds to the first node in the present disclosure.

In one embodiment, the second communication node 410 corresponds to the second node in the present disclosure.

In one embodiment, the first communication node 450 is a UE.

In one embodiment, the first communication node 450 is a terminal.

In one embodiment, the second communication node 410 is a base station.

In one embodiment, at least the first four of the antenna 452, the transmitter 454, the multi-antenna transmitting processor 457, the transmitting processor 468 and the controller/processor 459 are used for transmitting a first signal in a first cell and a second signal in a second cell; at least the first four of the antenna 420, the receiver 418, the multi-antenna receiving processor 472, the receiving processor 470 and the controller/processor 475 are used for receiving the first signal in the first cell and the second signal in the second cell.

In one embodiment, at least the first four of the antenna 452, the receiver 454, the multi-antenna receiving processor 458, the receiving processor 456 and the controller/processor 459 are used for receiving first information; at least the first four of the antenna 420, the transmitter 418, the multi-antenna transmitting processor 471, the transmitting processor 416 and the controller/processor 475 are used for transmitting the first information.

In one embodiment, at least the first four of the antenna 452, the receiver 454, the multi-antenna receiving processor 458, the receiving processor 456 and the controller/processor 459 are used for receiving a target signal in a third cell; at least the first four of the antenna 420, the transmitter 418, the multi-antenna transmitting processor 471, the transmitting processor 416 and the controller/processor 475 are used for transmitting the target signal in the third cell.

In one embodiment, at least the first four of the antenna 452, the receiver 454, the multi-antenna receiving processor 458, the receiving processor 456 and the controller/processor 459 are used for receiving a first signaling and a second signaling; at least the first four of the antenna 420, the transmitter 418, the multi-antenna transmitting processor 471, the transmitting processor 416 and the controller/processor 475 are used for transmitting the first signaling and the second signaling.

Embodiment 5

Figure 5:
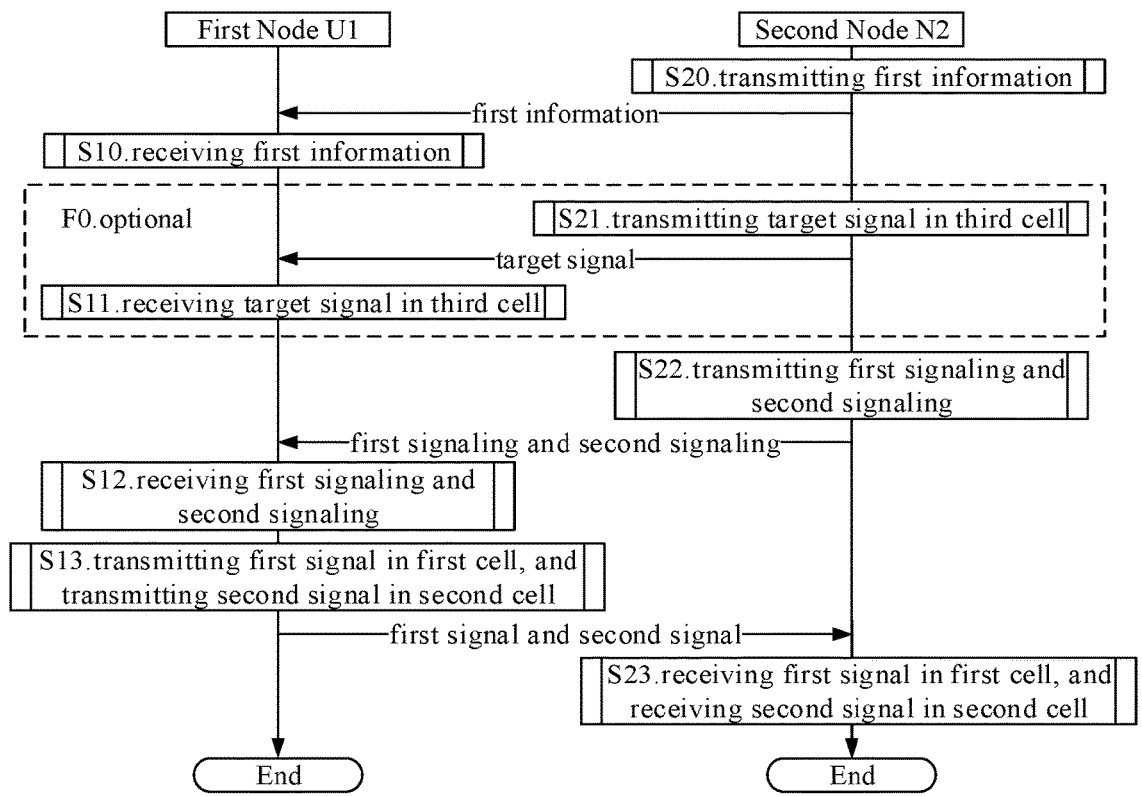
FIG. 5 illustrates a flowchart of a first signal according to one embodiment of the present disclosure.

Embodiment 5 illustrates a flowchart of a first signal, as shown in FIG. 5. In FIG. 5, a first node U1 and a second node N2 are in communication via a wireless link; steps marked by the box F0 are optional.

The first node U1 receives first information in step S10; receives a target signal in a third cell in step S11; receives a first signaling and a second signaling in step S12; and transmits a first signal in a first cell and transmits a second signal in a second cell in step S13.

The second node N2 transmits first information in step S20; transmits a target signal in step S21; transmits a first signaling and a second signaling in step S22; and receives a first signal in a first cell and a second signal in a second cell in step S23.

In Embodiment 5, a serving cell identity of the first cell is a first ID, while a serving cell identity of the second cell is a second ID, the first ID being smaller than the second ID; when the second cell is capable of scheduling a target cell, the second signal comprises first UCI; when the second cell is incapable of scheduling the target cell, the first signal comprises the first UCI; the first information indicates a scheduling cell of the target cell; when the scheduling cell of the target cell comprises the second cell, the second cell is capable of scheduling the target cell; when the scheduling cell of the target cell does not comprise the second cell, the second cell is incapable of scheduling the target cell; the first UCI is used for determining that the target signal is correctly received by the first node U1; the third cell is different from the second cell; the first signaling is used for indicating a first time-frequency resource set, and the second signaling is used for indicating a second time-frequency resource set; an uplink carrier for the first cell comprises frequency-domain resourced occupied by the first time-frequency resource set, and an uplink carrier for the second cell comprises the second time-frequency resource set; the first signal is transmitted in the first time-frequency resource set, while the second signal is transmitted in the second time-frequency resource set.

In one embodiment, a scheduling cell of the target cell comprises the target cell.

In one embodiment, the first information is transmitted by the target cell.

In one embodiment, the first information is transmitted on a downlink carrier for the target cell.

In one embodiment, the first information is transmitted in frequency-domain resources occupied by the target cell.

In one embodiment, the first information is transmitted on the target carrier in the present disclosure.

In one embodiment, the first information is a higher-layer signaling.

In one embodiment, the first information is an RRC signaling.

In one embodiment, the first information is UE-specific.

In one embodiment, the first information comprises part of fields in a CrossCarrierSchedulingConfig Information Element (IE).

In one embodiment, the first information is a CrossCarrierSchedulingConfig IE.

In one embodiment, the target cell is the first cell.

In one embodiment, the second ID is equal to 1.

In one embodiment, both the first cell and the second cell belong to a first cell group.

In one embodiment, both the second cell and the third cell belong to a first cell group.

In one subembodiment of the above two embodiments, the first cell group comprises K1 cells, K1 being greater than 1.

In one subembodiment of the above two embodiments, the first cell group comprises K1 cells, K1 being greater than 2.

In one subembodiment of the above two embodiments, the first cell group comprises the target cell in the present disclosure.

In one embodiment, a physical layer channel carrying the target signal comprises a PDSCH.

In one embodiment, a transmission channel carrying the target signal comprises a Downlink Shared Channel (DL-SCH).

In one embodiment, both the first cell and the second cell belong to a first cell group, the first cell group comprises K1 cells, and the first cell group comprises a fourth cell, the fourth cell capable of scheduling of the target cell; a serving cell identity of the fourth ID is a fourth ID, the second ID being smaller than the fourth ID.

In one subembodiment of the above embodiment, the fourth ID is a positive integer.

In one subembodiment of the above embodiment, the fourth ID is a Serving Cell Identity.

In one subembodiment of the above embodiment, the fourth ID is a ServCellIndex.

In one subembodiment of the above embodiment, the fourth ID is a ServCellId.

In one subembodiment of the above embodiment, the fourth ID is a CIF.

In one embodiment, the first signaling is DCI.

In one embodiment, the first signaling is UL Grant.

In one embodiment, the first signaling is used for scheduling the first signal.

In one embodiment, the second signaling is DCI.

In one embodiment, the second signaling is UL Grant.

In one embodiment, the second signaling is used for scheduling the second signal.

In one embodiment, a first time window comprises time-domain resources occupied by the first signal and time-domain resources occupied by the second signal, and the first node U1 does not transmit any radio signal in the target cell in the first time window.

In one embodiment, a first time window comprises time-domain resources occupied by the first signal and time-domain resources occupied by the second signal, and the first node U1 does not transmit any radio signal to the second node N2 in the first time window.

In one subembodiment, the first time window is a slot.

In one subembodiment, the phrase that the first node U1 does not transmit any radio signal in the target cell in the first time window includes the meaning that the first node U1 does not transmit any radio signal on an uplink carrier of the target cell.

In one subembodiment, the phrase that the first node U1 does not transmit any radio signal in the target cell in the first time window includes the meaning that the first node U1 does not transmit any radio signal on the target carrier in the present disclosure.

In one embodiment, serving cells carried by the second node N2 include the first cell and the second cell.

In one embodiment, serving cells carried by the second node N2 include the target cell.

In one embodiment, serving cells carried by the second node N2 include the third cell.

In one embodiment, serving cells carried by the second node N2 include the fourth cell.

Embodiment 6

Figure 6:
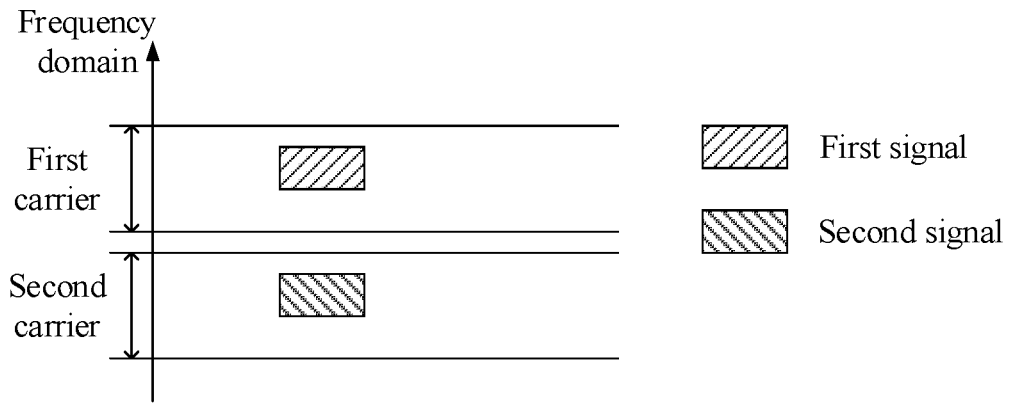
FIG. 6 illustrates a schematic diagram of a first signal and a second signal according to one embodiment of the present disclosure.

Embodiment 6 illustrates a schematic diagram of a first signal and a second signal, as shown in FIG. 6. In FIG. 6, the first signal is transmitted in a first carrier, and the second signal is transmitted in a second carrier.

In one embodiment, the first carrier is a Component Carrier (CC).

In one embodiment, the second carrier is a CC.

In one embodiment, the first carrier is capable of scheduling a cell other than a PCell.

In one embodiment, the first carrier is incapable of scheduling a PCell.

In one embodiment, the second carrier is capable of scheduling a PCell.

In one embodiment, time-domain resources occupied by the first signal overlap with time-domain resources occupied by the second signal.

In one embodiment, the first signal and the second signal occupy a same slot.

In one embodiment, the first signal occupies Q1 multicarrier symbols, while the second signal occupies Q2 multicarrier symbols, Q1 and Q2 both being positive integers greater than 1; there is at least one multicarrier symbol belonging to the Q1 multicarrier symbols and the Q2 multicarrier symbols simultaneously.

In one embodiment, the first carrier and the second carrier are both Secondary Carriers.

Embodiment 7

Figure 7:
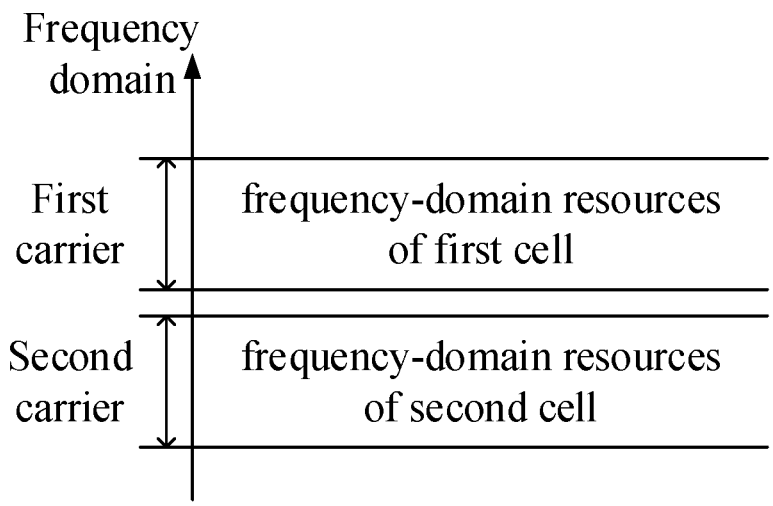
FIG. 7 illustrates a schematic diagram of a first cell and a second cell according to one embodiment of the present disclosure.

Embodiment 7 illustrates a schematic diagram of a first cell and a second cell, as shown in FIG. 7. In FIG. 7, a serving cell identity of the first cell is a first ID, and a serving cell identity of the second cell is a second ID.

In one embodiment, frequency-domain resources occupied by the first cell and frequency-domain resources occupied by the second cell are orthogonal.

In one embodiment, the second ID is equal to 1, and the first ID is equal to 0.

In one embodiment, the second ID is larger than the first ID.

Embodiment 8

Figure 8:
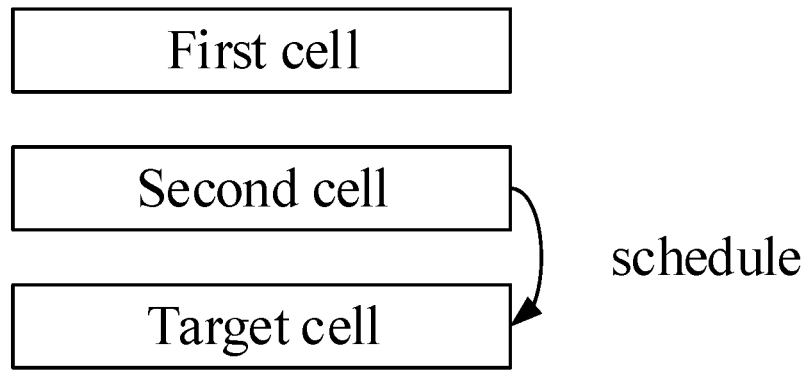
FIG. 8 illustrates a schematic diagram of a target cell according to one embodiment of the present disclosure.

Embodiment 8 illustrates a schematic diagram of a target cell according to the present disclosure; as shown in FIG. 8. In FIG. 8, the first cell is incapable of scheduling the target cell, while the second cell is capable of scheduling the target cell.

In one embodiment, the target cell is a PCell.

In one embodiment, frequency-domain resources occupied by the target cell belong to a main carrier.

In one embodiment, the target cell is incapable of scheduling the second cell.

In one embodiment, the target cell is capable of scheduling the first cell.

Embodiment 9

Figure 9:
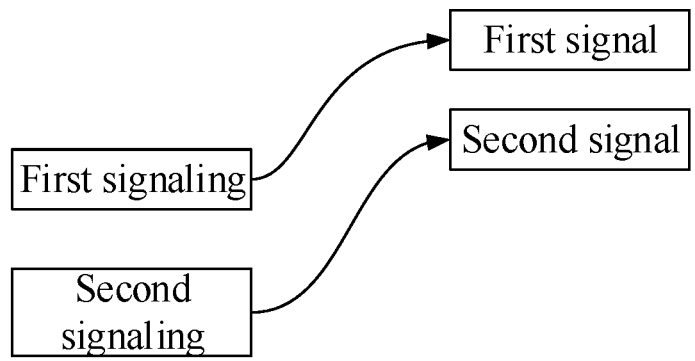
FIG. 9 illustrates a schematic diagram of a first signaling and a second signaling according to one embodiment of the present disclosure.

Embodiment 9 illustrates a schematic diagram of a first signaling and a second signaling, as shown in FIG. 9. In FIG. 9, the first signaling is used for triggering transmission of the first signal; the second signaling is used for triggering transmission of the second signal.

In one embodiment, the first signaling is used for scheduling the first signal.

In one embodiment, the second signaling is used for scheduling the second signal.

In one embodiment, the first signaling is used for triggering aperiodic CSI, the first signal comprising the aperiodic CSI.

In one embodiment, the second signaling is used for triggering aperiodic CSI, the second signal comprising the aperiodic CSI.

Embodiment 10

Figure 10:
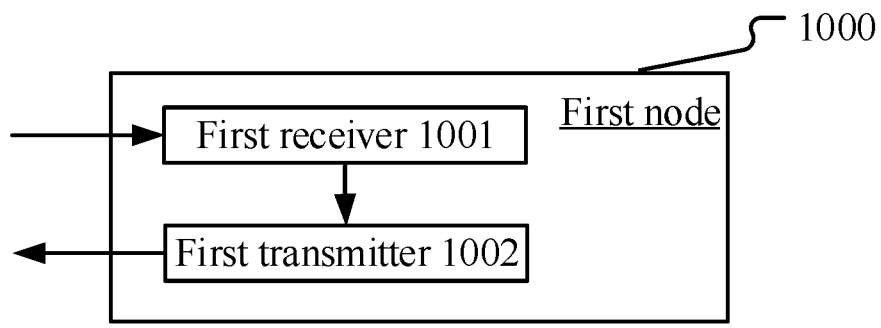
FIG. 10 illustrates a structure block diagram used for a first node according to one embodiment of the present disclosure.

Embodiment 10 illustrates a structure block diagram of a first node, as shown in FIG. 10. In FIG. 10, a first node 1000 comprises a first receiver 1001 and a first transmitter 1002.

The first receiver 1001 receives first information, the first information indicating a scheduling cell of the target cell.

The first transmitter 1002 transmits a first signal in a first cell, and transmits a second signal in a second cell.

In Embodiment 10, a serving cell identity of the first cell is a first ID, while a serving cell identity of the second cell is a second ID, the first ID being smaller than the second ID; when the second cell is capable of scheduling a target cell, the second signal comprises first UCI; when the second cell is incapable of scheduling the target cell, the first signal comprises the first UCI; when the scheduling cell of the target cell comprises the second cell, the second cell is capable of scheduling the target cell; when the scheduling cell of the target cell does not comprise the second cell, the second cell is incapable of scheduling the target cell.

In one embodiment, the target cell is the first cell.

In one embodiment, the second ID is equal to 1.

In one embodiment, the first receiver 1001 receives a target signal in a third cell; the first UCI is used for determining that the target signal is correctly received by the first node; the third cell is different from the second cell.

In one embodiment, both the first cell and the second cell belong to a first cell group, the first cell group comprises K1 cells, and the first cell group comprises a fourth cell, the fourth cell capable of scheduling of the target cell; a serving cell identity of the fourth ID is a fourth ID, the second ID being smaller than the fourth ID.

In one embodiment, the first receiver 1001 receives a first signaling and a second signaling; the first signaling is used for indicating a first time-frequency resource set, and the second signaling is used for indicating a second time-frequency resource set; an uplink carrier for the first cell comprises frequency-domain resourced occupied by the first time-frequency resource set, and an uplink carrier for the second cell comprises the second time-frequency resource set; the first signal is transmitted in the first time-frequency resource set, while the second signal is transmitted in the second time-frequency resource set.

In one embodiment, a first time window comprises time-domain resources occupied by the first signal and time-domain resources occupied by the second signal, and the first node does not transmit any radio signal in the target cell in the first time window.

In one embodiment, the first receiver 1001 comprises at least the first four of the antenna 452, the receiver 454, the multi-antenna receiving processor 458, the receiving processor 456 and the controller/processor 459 in Embodiment 4.

In one embodiment, the first transmitter 1002 comprises at least the first four of the antenna 452, the transmitter 454, the multi-antenna transmitting processor 457, the transmitting processor 468 and the controller/processor 459 in Embodiment 4.

Embodiment 11

Figure 11:
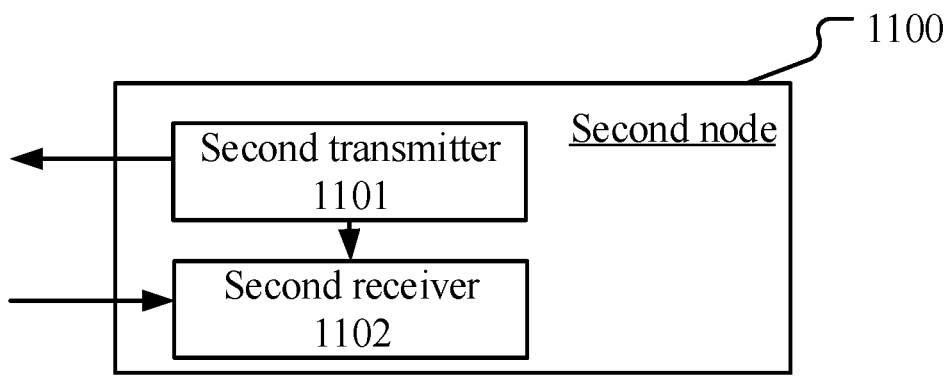
FIG. 11 illustrates a structure block diagram used for a second node according to one embodiment of the present disclosure.

Embodiment 11 illustrates a structure block diagram of a second node, as shown in FIG. 11. In FIG. 11, a second node 1100 comprises a second transmitter 1101 and a second receiver 1102.

The second transmitter 1101 transmits first information, the first information indicating a scheduling cell of the target cell.

The second receiver 1102 receives a first signal in a first cell and a second signal in a second cell.

In Embodiment 11, a serving cell identity of the first cell is a first ID, while a serving cell identity of the second cell is a second ID, the first ID being smaller than the second ID; when the second cell is capable of scheduling a target cell, the second signal comprises first UCI; when the second cell is incapable of scheduling the target cell, the first signal comprises the first UCI; when the scheduling cell of the target cell comprises the second cell, the second cell is capable of scheduling the target cell; when the scheduling cell of the target cell does not comprise the second cell, the second cell is incapable of scheduling the target cell.

In one embodiment, the target cell is the first cell.

In one embodiment, the second ID is equal to 1.

In one embodiment, the second transmitter 1101 transmits a target signal in a third cell; the first UCI is used for determining that the target signal is correctly received by a transmitter of the second signal; the third cell is different from the second cell.

In one embodiment, both the first cell and the second cell belong to a first cell group, the first cell group comprises K1 cells, and the first cell group comprises a fourth cell, the fourth cell capable of scheduling of the target cell; a serving cell identity of the fourth ID is a fourth ID, the second ID being smaller than the fourth ID.

In one embodiment, the second transmitter 1101 transmits a first signaling and a second signaling; the first signaling is used for indicating a first time-frequency resource set, and the second signaling is used for indicating a second time-frequency resource set; an uplink carrier for the first cell comprises frequency-domain resourced occupied by the first time-frequency resource set, and an uplink carrier for the second cell comprises the second time-frequency resource set; the first signal is transmitted in the first time-frequency resource set, while the second signal is transmitted in the second time-frequency resource set.

In one embodiment, a first time window comprises time-domain resources occupied by the first signal and time-domain resources occupied by the second signal, and the first node does not transmit any radio signal in the target cell in the first time window.

In one embodiment, the second transmitter 1101 comprises at least the first four of the antenna 420, the transmitter 418, the multi-antenna transmitting processor 471, the transmitting processor 416 and the controller/processor 475 in Embodiment 4.

In one embodiment, the second receiver 1102 comprises at least the first four of the antenna 420, the receiver 418, the multi-antenna receiving processor 472, the receiving processor 470 and the controller/processor 475 in Embodiment 4.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The first node and the second node in the present disclosure include but are not limited to mobile phones, tablet computers, notebooks, network cards, low-consumption equipment, enhanced MTC (eMTC) terminals, NB-IoT terminals, vehicle-mounted communication equipment, vehicles, automobiles, RSU, aircrafts, airplanes, unmanned aerial vehicles, telecontrolled aircrafts, etc. The base station in the present disclosure includes but is not limited to macro-cellular base stations, micro-cellular base stations, home base stations, relay base station, eNB, gNB, Transmitter Receiver Point (TRP), GNSS, relay satellite, satellite base station, airborne base station, RSU and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first node for wireless communications, comprising:
a first receiver, which receives first information, the first information indicating a scheduling cell of a target cell;
a first transmitter, which transmits a first signal in a first cell, and transmits a second signal in a second cell; wherein:
a serving cell identity of the first cell is a first ID, the first cell is a Secondary Cell, while a serving cell identity of the second cell is a second ID, the first ID being smaller than the second ID; the second ID is a Carrier Indicator Field (CIF);
when the second cell is capable of scheduling the target cell, the second signal comprises first uplink control information (UCI);
when the second cell is incapable of scheduling the target cell, the target cell is a Primary Cell, the second cell is a Secondary Cell, the first signal comprises the first UCI;
when the scheduling cell of the target cell comprises the second cell, the second cell is capable of scheduling the target cell;
when the scheduling cell of the target cell does not comprise the second cell, the second cell is incapable of scheduling the target cell; and
the first information is an RRC signaling, the first information comprises part of fields in a CrossCarrierSchedulingConfig Information Element (IE).

2. The first node according to claim 1, wherein the target cell is the first cell.

3. The first node according to claim 1, wherein the second ID is equal to 1.

4. The first node according to claim 1, wherein the first receiver receives a target signal in a third cell; the first UCI is used for determining that the target signal is correctly received by the first node; the third cell is different from the second cell.

5. The first node according to claim 1, wherein both the first cell and the second cell belong to a first cell group, the first cell group comprises K1 cells, and the first cell group comprises a fourth cell, the fourth cell capable of scheduling of the target cell; a serving cell identity of the fourth ID is a fourth ID, the second ID being smaller than the fourth ID.

6. The first node according to claim 1, wherein the first receiver receives a first signaling and a second signaling; the first signaling is used for indicating a first time-frequency resource set, and the second signaling is used for indicating a second time-frequency resource set; an uplink carrier for the first cell comprises frequency-domain resourced occupied by the first time-frequency resource set, and an uplink carrier for the second cell comprises the second time-frequency resource set; the first signal is transmitted in the first time-frequency resource set, while the second signal is transmitted in the second time-frequency resource set.

7. The first node according to claim 1, wherein a first time window comprises time-domain resources occupied by the first signal and time-domain resources occupied by the second signal, and the first node does not transmit any radio signal in the target cell in the first time window.

8. The first node according to claim 1, wherein the first ID is a CIF.

9. The first node according to claim 1, wherein a serving cell identity of the target cell is a target ID, the target ID being equal to 0.

10. The first node according to claim 1, wherein the target cell is a PCell.

11. A second node for wireless communications, comprising:
a second transmitter, which transmits first information, the first information indicating a scheduling cell of a target cell;
a second receiver, which receives a first signal in a first cell, and receives a second signal in a second cell; wherein:
a serving ID of the first cell is a first ID, the first cell is a Secondary Cell, while a serving cell identity of the second cell is a second ID, the first ID being smaller than the second ID; the second ID is a Carrier Indicator Field (CIF); when the second cell is capable of scheduling the target cell, the second signal comprises first UC;
when the second cell is incapable of scheduling the target cell, the target cell is a Primary Cell, the second cell is a Secondary Cell, the first signal comprises the first UCI;
when the scheduling cell of the target cell comprises the second cell, the second cell is capable of scheduling the target cell;
when the scheduling cell of the target cell does not comprise the second cell, the second cell is incapable of scheduling the target cell; and
the first information is an RRC signaling, the first information comprises part of fields in a CrossCarrierSchedulingConfig Information Element (IE).

12. The second node according to claim 11, wherein the target cell is the first cell.

13. The second node according to claim 11, wherein the second ID is equal to 1.

14. The second node according to claim 11, wherein the second transmitter transmits a target signal in a third cell; the first UCI is used for determining that the target signal is correctly received by a transmitter of the second signal; the third cell is different from the second cell.

15. The second node according to claim 11, wherein both the first cell and the second cell belong to a first cell group, the first cell group comprises K1 cells, and the first cell group comprises a fourth cell, the fourth cell capable of scheduling of the target cell; a serving cell identity of the fourth ID is a fourth ID, the second ID being smaller than the fourth ID.

16. The second node according to claim 11, wherein the second transmitter transmits a first signaling and a second signaling; the first signaling is used for indicating a first time-frequency resource set, and the second signaling is used for indicating a second time-frequency resource set; an uplink carrier for the first cell comprises frequency-domain resourced occupied by the first time-frequency resource set, and an uplink carrier for the second cell comprises the second time-frequency resource set; the first signal is transmitted in the first time-frequency resource set, while the second signal is transmitted in the second time-frequency resource set.

17. A method in a first node for wireless communications, comprising:
receiving first information, the first information indicating a scheduling cell of a target cell;
transmitting a first signal in a first cell, and transmitting a second signal in a second cell; wherein:
a serving cell identity of the first cell is a first ID, the first cell is a Secondary Cell, while a serving cell identity of the second cell is a second ID, the first ID being smaller than the second ID; the second ID is a Carrier Indicator Field (CIF);
when the second cell is capable of scheduling the target cell, the second signal comprises first uplink control information (UCI);
when the second cell is incapable of scheduling the target cell, the target cell is a Primary Cell, the second cell is a Secondary Cell, the first signal comprises the first UCI;
when the scheduling cell of the target cell comprises the second cell, the second cell is capable of scheduling the target cell;
when the scheduling cell of the target cell does not comprise the second cell, the second cell is incapable of scheduling the target cell; and
the first information is an RRC signaling, the first information comprises part of fields in a CrossCarrierSchedulingConfig Information Element (IE).

* * * * *